United States Patent
Berger et al.

(10) Patent No.: US 11,411,401 B2
(45) Date of Patent: Aug. 9, 2022

(54) SYSTEM FOR REDUCING LOAD PEAKS IN AN ELECTRICAL INSTALLATION

(71) Applicant: Bayerische Motoren Werke Aktiengesellschaft, Munich (DE)

(72) Inventors: Jens Berger, Munich (DE); Alexander Funke, Baldham (DE); Julian Rominger, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 262 days.

(21) Appl. No.: 16/735,082

(22) Filed: Jan. 6, 2020

(65) Prior Publication Data

US 2020/0144818 A1   May 7, 2020

Related U.S. Application Data

(63) Continuation of application No. PCT/EP2018/065280, filed on Jun. 11, 2018.

(30) Foreign Application Priority Data

Jul. 7, 2017   (DE) ..................... 10 2017 211 690.0

(51) Int. Cl.
*H02J 3/00* (2006.01)
*H02J 3/14* (2006.01)
(Continued)

(52) U.S. Cl.
CPC ............... *H02J 3/003* (2020.01); *H02J 3/14* (2013.01); *H02J 3/32* (2013.01); *H02J 3/381* (2013.01)

(58) Field of Classification Search
CPC ...... H02J 3/003; H02J 3/14; H02J 3/32; H02J 3/381; H02J 2310/12; H02J 13/0006;
(Continued)

(56) References Cited

U.S. PATENT DOCUMENTS

| 3,906,242 | A | | 9/1975 | Stevenson |
| 5,883,802 | A | * | 3/1999 | Harris ................. H02J 3/14 |
| | | | | 700/27 |

(Continued)

FOREIGN PATENT DOCUMENTS

| AT | 502 460 A1 | 3/2007 |
| DE | 10 2016 110 716 A1 | 12/2017 |

(Continued)

OTHER PUBLICATIONS

PCT/EP2018/065280, International Search Report dated Aug. 22, 2018 (Two (2) pages).

(Continued)

*Primary Examiner* — Thomas C Lee
*Assistant Examiner* — Anzuman Sharmin
(74) *Attorney, Agent, or Firm* — Crowell & Moring LLP

(57) ABSTRACT

A method for controlling at least one controllable system component in an electrical installation, where the installation is connected to an electrical supply network via a network connection. A measurement value of a performance from the supply network is detected for each individual successive time interval, and if one of the measurement values is larger than a predetermined threshold value, the performance is guided below the threshold value by switching electrical compensation power. The measurement value of the current time interval is predicted as a forecast value using a control device at at least one time within the current time interval in question by using forecast data to add a future course of the performance extending to the end of the time interval, and thereby deciding during the time interval how much compensation power is necessary.

11 Claims, 3 Drawing Sheets

(51) Int. Cl.
*H02J 3/32* (2006.01)
*H02J 3/38* (2006.01)

(58) Field of Classification Search
CPC ....... H02J 3/322; H02J 3/144; Y02B 70/3225; Y04S 20/222
See application file for complete search history.

(56) References Cited

U.S. PATENT DOCUMENTS

| | | | |
|---|---|---|---|
| 6,747,370 B2 | 6/2004 | Abe | |
| 2004/0225625 A1* | 11/2004 | Van Gorp | G06Q 30/04 705/412 |
| 2004/0263116 A1 | 12/2004 | Doruk et al. | |
| 2007/0035290 A1* | 2/2007 | Schweigert | H02J 3/32 324/142 |
| 2012/0025983 A1 | 2/2012 | Ben-Zion et al. | |
| 2015/0303690 A1* | 10/2015 | Miyazaki | H02J 7/34 700/291 |
| 2017/0133845 A1* | 5/2017 | Geyer | H02J 3/1821 |
| 2017/0373500 A1* | 12/2017 | Shafi | G05B 13/027 |

FOREIGN PATENT DOCUMENTS

| | | |
|---|---|---|
| EP | 1 821 381 A2 | 8/2007 |
| EP | 2 757 649 A1 | 7/2014 |
| WO | WO 2012/014731 A1 | 2/2012 |
| WO | WO 2014/029420 A1 | 2/2014 |

OTHER PUBLICATIONS

German Search Report issued in German counterpart application No. 10 2017 211 690.0 dated Jun. 21, 2018, with Statement of Relevancy (Thirteen (13) pages).

German-language German Office Action issued in German counterpart application No. 10 2017 211 690.0 dated Jun. 22, 2018 (Ten (10) pages).

* cited by examiner

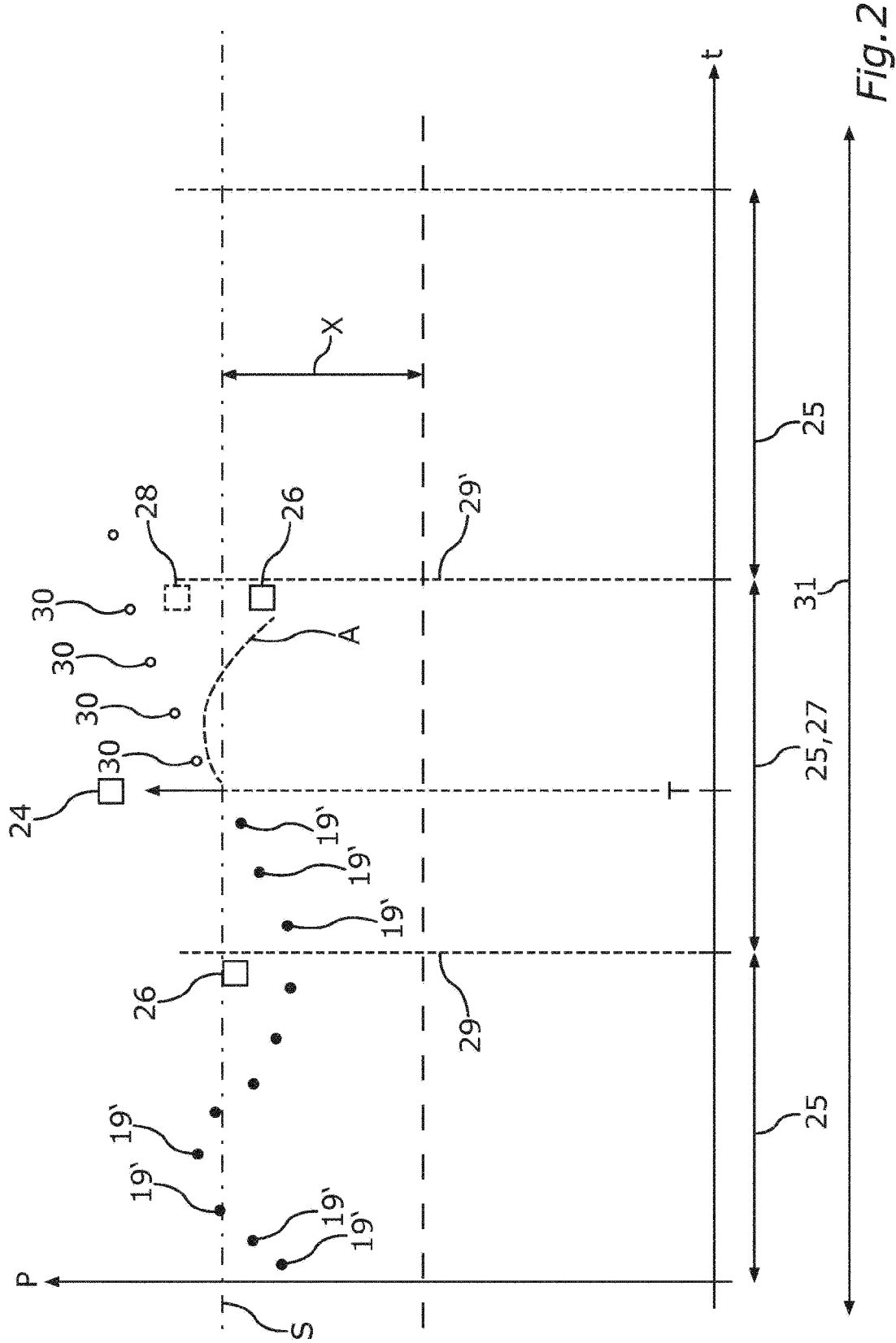

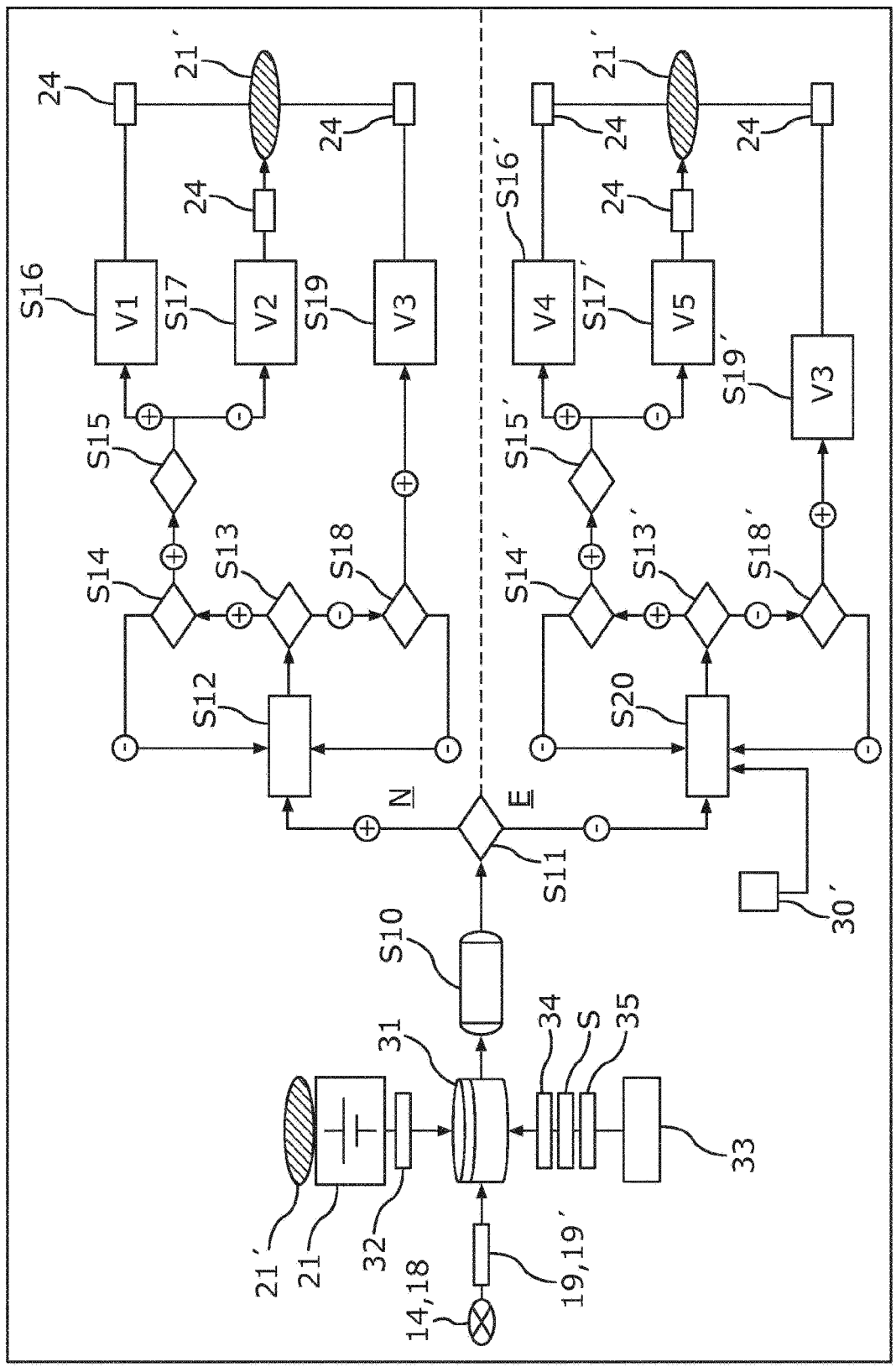

SYSTEM FOR REDUCING LOAD PEAKS IN AN ELECTRICAL INSTALLATION

CROSS REFERENCE TO RELATED APPLICATIONS

This application is a continuation of PCT International Application No. PCT/EP2018/065280, filed Jun. 11, 2018, which claims priority under 35 U.S.C. § 119 from German Patent Application No. 10 2017 211 690.0, filed Jul. 7, 2017, the entire disclosures of which are herein expressly incorporated by reference.

BACKGROUND AND SUMMARY OF THE INVENTION

The invention relates to a method for controlling a controllable installation component in an electrical installation. The installation can be a production site, for example. The installation is generally connected to an electrical supply network via a network connection. By means of a control device and the controllable installation component, so-called "peak shaving" is carried out in relation to the network connection, that is to say that a power withdrawal of the installation from the electrical supply network is limited to a threshold value. The invention also includes a control device for the controllable installation component, and a system for reducing electrical load peaks in an electrical installation.

An installation can be, for example, a factory site having a plurality of electricity consumers, electricity generators and electricity stores. An installation in association with the invention is generally distinguished by the fact that the electrical power that it withdraws via the network connection is billed not only according to the resulting quantity of energy but also according to the magnitude of its maximum power withdrawal in a billing period (e.g., one year), i.e., how much electrical power thus had to be provided. This is billed for individual time intervals, which can have a duration of, for example, 15 minutes. In this case, there is a power price per withdrawn power (MW or kW), which price is fixed by the distribution network operators. The average value of the electrical power withdrawn in a time interval is taken as a basis here as billing-relevant power withdrawal. Therefore, the operator of the installation has an interest in keeping the power withdrawal, that is to say the electrical power withdrawn from the supply network via the network connection, below a threshold value on average for each time interval.

A system of the type mentioned in the introduction is known for example from U.S. Pat. No. 6,747,370 B2. The system from the prior art exhibits high-speed switching, that is to say that the present power withdrawal is monitored and the battery provided in the system is immediately switched in when the threshold value is exceeded.

However, such spontaneous switching in is technically complex to realize and not always necessary. In general, at a network connection, the power withdrawal is not detected as an instantaneous value, but rather as an average value over a given time interval. The time interval can have a duration of 15 minutes, for example. A disadvantage, for example higher withdrawal costs for the power, arises for the installation only if the average value is above the threshold value. The instantaneous power withdrawal can thus be above the threshold value without the disadvantage arising as long as the average value computed over the entire time interval actually remains below the threshold value. Thus, it is only for those time intervals over which the average value of the power withdrawal is above the threshold value that the predetermined disadvantage occurs, that is to say for example higher withdrawal costs for the power withdrawal in that time interval.

The detection of power values of an installation and the combination to form average values over individual time intervals are known from US 2012/0259583 A1. What is disadvantageous about this combination of present power values and the subsequent calculation of the average value, however, is that the fact of whether the average value is above the threshold value is known only at the end of a time interval. Consequently, for the time interval the power withdrawal can no longer be corrected and the disadvantage arises, that is to say for example the higher withdrawal costs. The "peak shaving" can then be initiated as a precaution only for the next time interval.

With regard to such "peak shaving", it is known from U.S. Pat. No. 3,906,242 A to switch off installation components of an installation spontaneously if the power withdrawal is above a threshold value. However, this restricts the functional scope of the installation.

US 2004/0263116 A1 discloses a control device for controlling a plurality of energy storage units. The energy storage units are coordinated to the effect that they take up or release energy, specifically in such a way that is optimal for the cluster of energy storage units. This means, however, that it is no longer possible for each energy storage unit to react individually to the local demand.

The invention is based on the object of carrying out, in an electrical installation by means of an installation component, load peak limiting ("peak shaving") in relation to the power withdrawal at the network connection of the installation.

The invention provides a method for controlling a controllable installation component in an electrical installation. The controllable installation component is generally an installation component which is flexibly controllable in terms of its power consumption or its power generation for the purpose of load peak limiting. A generator or a store or a consumer can be involved. The controllable installation component can contain, for example, an energy store or else a pure energy source. The opposite of a controllable installation component is a non-controllable installation component, which means that the power thereof cannot be altered for the purpose of load peak limiting because, for example, the production of a product is dependent on it. A controllable installation component can comprise, for example, a battery arrangement as store and/or, for example, a combined heat and power plant as generator. The controllable installation component can be a consumer, e.g., a ventilation installation, the delivery capacity of which is adjustable.

The installation can be connected to an electrical supply network via a network connection in a manner known per se. For the operation of its installation components (controllable or non-controllable), the installation can thus receive electrical power from the electrical supply network via the network connection. In the event of a network-related power withdrawal, that is to say the electrical power withdrawn from the supply network, here being greater than a predetermined threshold value, the load peak limiting is carried out. For this purpose, the power withdrawal (from the supply network) is guided below the threshold value by the switching of electrical compensation power by means of the controllable installation component. The controllable installation component is after all part of the installation, and so in the case of a controllable installation component which is a generator or a store, a compensation power output by the installation component does not flow via the network connection, but rather passes to another installation component directly via the electrical installation network. In other words, the compensation power output by the controllable installation component is thus used to supply at least one other, further installation component with electrical power, with the result that this power need no longer be withdrawn via the network connection. In the case of a controllable installation component which is itself a consumer, switching leads directly to a lower withdrawal from the network. The compensation power is thus a power that is additionally fed in by means of a generator or a store or a power that becomes available as a result of a consumer being restricted. The switching of the compensation power by means of the installation component can be effected, for example, as temporally programmed discharging of an energy store or the restriction of a consumer to a predetermined power or by means of a closed-loop control.

As already described in the introduction, the method assumes that the power withdrawal is a respective average value calculated in each case for individual, successive time intervals. The power withdrawal is thus detected as a respective average value over individual, successive time intervals. If the present power withdrawal is above the threshold value, then this means that the average value calculated for the present time interval is above the threshold value.

What then arises, however, is the problem described in the introduction that during the present time interval it is not known what average value will arise at the end of the present time interval. Consequently, the fact of whether the average value was exceeded can be identified actually only at the end of the time interval. In that case, however, it is only for the subsequent time interval that a countermeasure (i.e., the load peak limiting) can be implemented, namely the compensation power can be fed in. In order to react earlier, that is to say already before the end of the present time interval, the invention provides the following. At at least one point in time within the respective present time interval, the average value of the present time interval is already predicted by a control device. A forecast of the average value thus takes place. For this purpose, a future profile of the power withdrawal extending to the end of the time interval is added on the basis of forecast data of at least one further installation component of the installation. Consequently, already during the time interval a decision can be taken as to how much compensation power the controllable installation component ought to output into the installation or by how much compensation power the consumption of the controllable installation component ought to be restricted in order actually still to obtain at the end of the present time interval an average value that is less than the threshold value. On the basis of the forecast data, the average value for the present time interval can thus be predicted as forecast value even though the present time interval has not yet ended at all. If the forecast value is greater than the threshold value, the controllable installation component can already be driven or switched within the time interval or during the time interval in order that, with its compensation power, it reduces the power withdrawal already within the present time interval, in order thereby to guide the average value to the end of the time interval below the threshold value. The active outputting of compensation power, on the one hand, and the power restriction for making compensation power available, on the other hand, are referred to hereinafter in combination as "provision of compensation power".

The invention affords the advantage that already for the present time interval before the end thereof a switching signal or control signal for the controllable installation component can be generated, with the result that compensation power is already provided in the present time interval if the fact that this time interval will be expected to have an average value greater than the threshold value is recognized or forecast for this time interval. Consequently, already for the present time interval it is possible to prevent the average value thereof from exceeding the threshold value and thus increased withdrawal costs, for example, from arising. The average value of the power withdrawal that is forecast for the end of the present time interval is referred to hereinafter as forecast value.

Until now the invention has been described such that it has been assumed that only a single controllable installation component is controllable flexibly in relation to its compensation power. Of course, a plurality of controllable installation components can also be provided, which can then be controlled in each case in accordance with the method in order thus to provide a required compensation power overall with a plurality of controllable installation components. In order to simplify the explanation of the invention, only a single controllable installation component is taken as a basis hereinafter. However, the method can be applied in the stated manner to a plurality of controllable installation components at the same time, in order to provide the compensation power by means of the components in total.

The invention also includes developments that afford additional advantages.

The temporal profile of the power withdrawal is described by successive measurement values of the electrical power presently withdrawn from the supply network via the network connection. In order not to have to carry out the calculation of the forecast value, that is to say the forecast of the average value, for each measurement value, the following development is provided. During the respective present time interval successive measurement values of the present network-related power withdrawal are determined and the forecast value is checked, however, only if a present measurement value is greater than or equal to the threshold value. If the forecast value was previously below the threshold value, no switching processes are necessary. This situation can change only if the present measurement value is greater than the threshold value. It is thus possible to dispense with the repeated calculation of the forecast value until a present measurement value greater than the threshold value is present. Computation resources are thus saved as a result. For safety purposes, recalculation can already be carried out in the event of a present measurement value equal to the threshold value. That also affords the advantage that switching processes are avoided if the forecast predicts a favorable power profile. There is then a need to react only toward the end of the relevant time interval. Superfluous switching processes are thus avoided.

A duration of each time interval for which the average value is calculated in each case is preferably in a range of 30 seconds to 15 minutes. In this regard, by way of example, a time interval having a duration of 15 minutes can be provided. Within this duration, by means of an installation component, the average value can still be guided below the threshold value in good time before the end of the time interval if the forecast value is above the threshold value.

The forecast data used for the forecast are preferably formed from historical power data of the at least one further (non-controllable) installation component of the installation. The power data can describe a consumption and/or a generation of power of the respective installation component. The typical behavior of the at least one further installation component can thus be taken into account. For a present time interval, it is possible to select a subset from the forecast data. This can be done taking as a basis historical power data that arose under the same states and/or conditions such as also prevail during the present time interval. In this regard, it is thus possible to select the subset from the historical power data depending on the season, the day of the week, the time of day, the weather and/or the job data and/or other data describing the capacity utilization of the at least one further installation component. Furthermore, the forecast can be enhanced by present forecast-relevant input parameter data, for example, related to the weather and/or a failure of at least one installation component and/or an adaptation of production numbers, which are relevant to the energy consumption and/or energy generation.

If the power withdrawal of the installation rises abruptly during a time interval, under certain circumstances it may be too late still to provide enough compensation power by means of the controllable installation component in order that the average value for the present time interval is below the threshold value at the end. Therefore, in accordance with one development, a precaution is taken by creating a buffer X. In the case of this development, in the event of the forecast value (predicted average value) being less than the threshold value S but already greater than a predetermined safety value S-X, a preparatory measure is taken. The preparatory measure consists in the power withdrawal being reduced to the safety value S-X by means of the controllable installation component by the stipulation of a setpoint value for the compensation power to be output thereby. By means of the compensation power, it is thus endeavored to ensure that the power withdrawal tends toward the safety value for the rest of the time interval. If the power demand of the installation rises unexpectedly and/or abruptly, then the buffer X is still available. The buffer X can also be adapted dynamically in order to compensate for possible incorrect forecasts. Moreover, the buffer preferably adapts itself dynamically as time progresses in a time interval.

In order that the average value can be forecast within a present time interval, the stated measurement values describing the power withdrawal from the beginning of the time interval to the present point in time are necessary. This is the case in a normal operating mode, in which, for calculating the forecast value, a previous profile of the power withdrawal extending from the start or beginning of the time interval onward and up to the present point in time is formed on the basis of measurement values from the at least one further (non-controllable) installation component and/or from measurement values from the network connection. If measurement values are available, a measurement interval in a range of 1 second to 10 seconds has proved to be advantageous in order to describe a trend in the profile of the power withdrawal sufficiently accurately.

However, this presupposes that the measurement values are actually available in the control device that is intended to carry out the forecast. If these measurement values are absent, for example, because the communication connection has been interrupted, then there is a switch to an error operating mode, in which further forecast data of the at least one further installation component are taken as a basis for the description of the profile of the power withdrawal from the start of the time interval to the present point in time. Thus, if there is no data connection between the electricity meters or power meters, firstly, and the control device, secondly, then the average value can still be calculated "blind" solely on the basis of forecast data.

In the event of the power withdrawal of the installation being less than the threshold value, the controllable installation component can be regenerated with electrical power from the supply network if the controllable installation component precisely need not deliver any compensation power. If the controllable installation component comprises for example an electrochemical rechargeable battery, that is to say a battery, the latter can thus be charged.

The stated threshold value need not be valid for the whole day. In one predetermined operating situation it may be the case that a so-called high-load time window is defined for the supply network and the threshold value is valid only within the high-load time window. The described limiting of the power withdrawal is then also correspondingly limited to the duration of the high-load time window. Outside the high-load time window, for example, the exceedance of the threshold value is then not relevant to billing. Accordingly, the controllable installation component can also be regenerated outside the high-load time window, that is to say that a rechargeable battery of the controllable installation component, for example, can be charged.

In order to be able to carry out the method according to the invention in an installation, the invention provides a control device for controlling at least one controllable installation component. The control device comprises a computing unit, for example comprising a microprocessor, wherein the computing unit is configured to carry out an embodiment of the method according to the invention. For this purpose, provision can be made of a program code for the computing unit, which program code, when executed by the computing unit, carries out the embodiment of the method according to the invention. The computing unit can also be based on a cloud solution or internet-based installation from which it sends control signals to a local controller of the at least one controllable installation component.

Combining the control device with at least one controllable installation component yields a system according to the invention for reducing electrical load peaks in an electrical installation. The control device can be configured for example as a control unit or as a control computer for the at least one controllable installation component or for the installation.

An installation can be for example a production installation at a production site or an industrial installation. However, the installation can also be for example a building installation, for example for offices.

Further features of the invention are evident from the claims, the figures and the description of the figures. The features and feature combinations mentioned above in the description and also the features and feature combinations mentioned below in the description of the figures and/or shown solely in the figures are usable not only in the combination respectively indicated, but also in other combinations or by themselves.

One exemplary embodiment of the invention is described below.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a diagram with a schematic profile of a power withdrawal of the installation from FIG. 1; and FIG. 3 shows a flowchart for illustrating one embodiment of the method according to the invention such as can be carried out in the installation from FIG. 1.

DETAILED DESCRIPTION OF THE DRAWINGS

Figure 1:
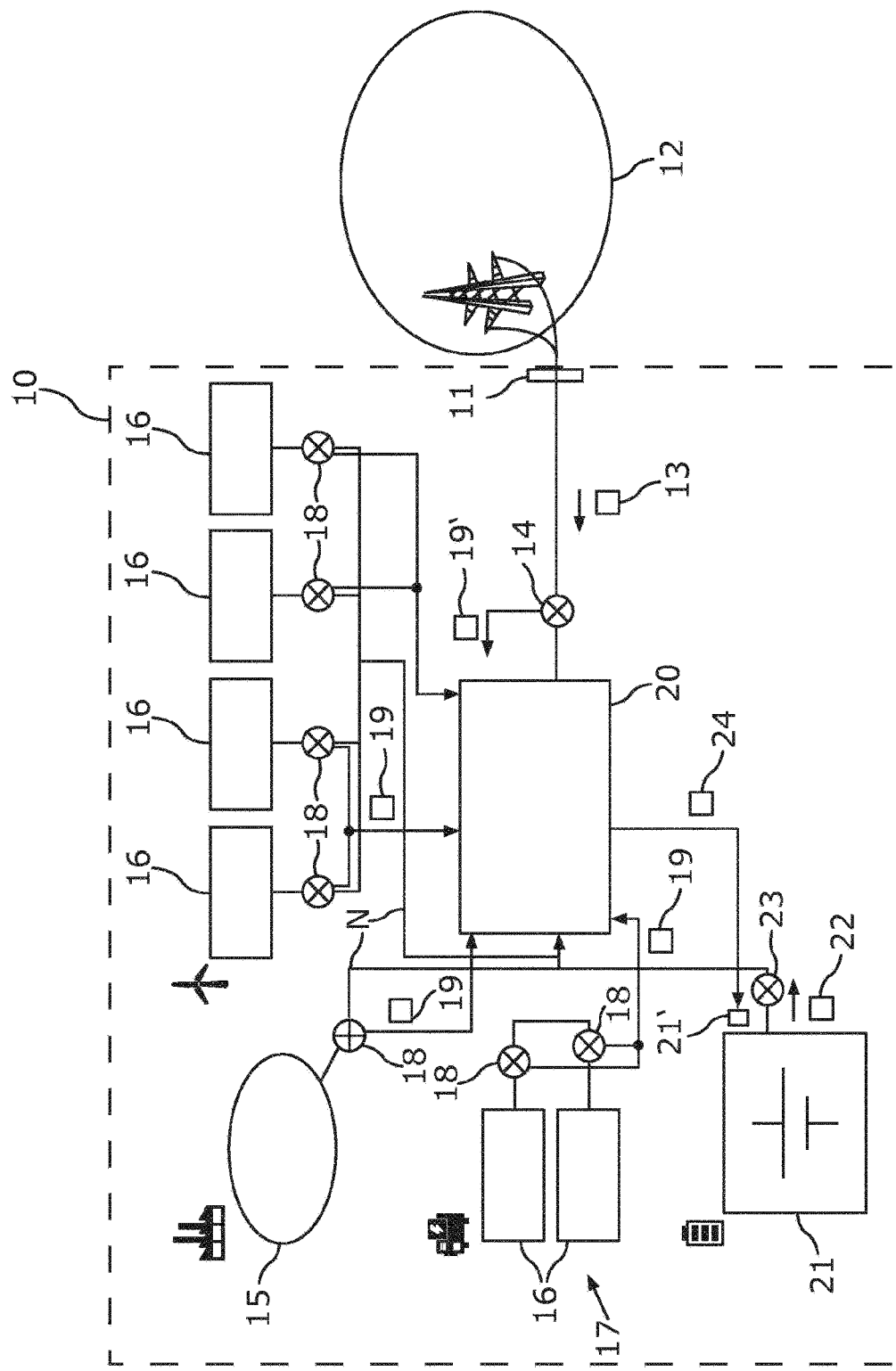
FIG. 1 shows a schematic illustration of an installation with one embodiment of the system according to the invention for reducing electrical load peaks in the installation.

FIG. 1 shows an installation 10, which can be for example a factory for producing a product, e.g., a production installation for motor vehicles. In order to supply the installation 10 with electrical energy, an electrical installation network or factory network N of the installation 10 can be connected to an electrical supply network 12 via a network connection 11. The supply network can be for example an electrical supply network for 50 hertz AC current, for example a high-voltage network, medium-voltage network or low-voltage network.

From the supply network 12, the installation 10 can receive electrical power 13, which can be measured by a network meter or factory meter 14 for electrical power or electrical energy. Such a factory meter 14 is part of the prior art. The electrical power 13 can be distributed among the installation components 17 via the factory network N.

The installation 10 can comprise at least one electrical consumer 15 and optionally at least one electrical generator 16. In this case, each consumer 15 and each generator 16 constitutes an installation component 17 that is non-controllable in relation to load peak limiting, for example, because its reaction times are not short enough or a predetermined operating point is predefined therefor. The at least one electrical consumer 15 can be for example a production system or conveying system or signaling system. A generator 16 can be formed, for example, by a coal-fired power plant or a solar installation or a wind power installation. A respectively generated or consumed electrical power of the respective installation component 17 can be detected by a respective component meter 18. A component meter corresponds to a factory meter in terms of its functioning.

Respective measurement values 19 of each component meter 18 and measurement values 19' of the factory meter 14 can be signaled to a control device 20, which can be realized by a building control system.

The installation 10 can furthermore comprise an installation component 21 which is controllable for the load peak limiting, and which can be for example a battery store or an electrical storage farm composed, for example, of capacitors and/or batteries. However, the battery store here should be regarded merely as one example of a flexibly controllable installation component.

An electrical compensation power 22 provided by the installation component 21 in the factory network N can be detected by a meter 23 in order to be able to adjust the compensation power 22, for example, to a setpoint value. The compensation power 22 provided by the installation component 21 can be the effective active power thereof. In other words, a power factor correction brought about by the installation component 21 can be disregarded.

The setpoint value of the compensation power 22 can be stipulated or set by the control device 20 by means of a control signal 24 for the installation component 21. The control signal 24 can be transmitted, for example, to a programmable logic controller 21' of the installation component 21, which then adjusts the compensation power 22 to the setpoint value.

Overall the at least one electrical consumer 15 of the installation 10 can thus receive electrical power from the installation's own electrical generators 16, the electrical supply network 12 and the installation component 21.

In the case of the installation 10, for the withdrawal of the electrical power 13 from the supply network 12, provision can be made of a threshold-value-dependent tariff for payment for the power 13, which is explained in association with FIG. 2.

FIG. 2 shows, versus time t, the power withdrawal P of the installation 10 from the supply network 12 via the network connection 11. The measurement values 19' of the factory meter 14 are illustrated, only some of which values are provided with a reference sign, for the sake of clarity. For successive time intervals 25, provision can be made for the average value 26 of the power withdrawal P to be determined. As long as the average value 26 for a time interval 25 is less than the threshold value S, a power price for the withdrawn power P is related to the threshold value S. If the average value 26 is greater than the threshold value S, for an entire billing period 31 (e.g., one year) a higher power value is used as a basis of assessment for payment of the power price.

The control device 20 can therefore drive the installation component 21 by means of the control signal 24 whenever the average value 26 is above the threshold value S, with the result that the power withdrawal P is below the threshold value S on average at least for subsequent time intervals 25.

In the case of the installation 10, however, already during a present time interval 27, at a point in time T within the present time interval 27, the control device 20 can also decide or determine whether, for the present time interval 27, the average value 26 will be expected to be above the threshold value. A forecast or predicted forecast value 28 of the average value is determined for this purpose. The measurement values 19' of the factory meter 14 up to the present point in time T can be taken as a basis for this purpose. The power withdrawal P can thereby be determined from a start 29 of the present time interval 27 to the present point in time T. For the time period from the present point in time T to the end 29' of the present time interval 27, forecast data 30 describing a historical behavior or historical power data of the installation components 15, 16 of the installation 10 can be taken as a basis by the control device 20. The forecast average value or forecast value 28 for the present time interval 27 can thus be calculated. If this forecast value 28 is above the threshold value S, then the control device 20 can configure the installation component 21 by means of the control signal 24 to the effect that the installation component feeds compensation power 22 into the factory network N. As a result, already in the present time interval 27, the power withdrawal P decreases, that is to say that less electrical power 13 is withdrawn from the supply network 12 via the network connection 11. Therefore, if the forecast value 28 is greater than the threshold value S, a setpoint value for the compensation power 22 of the installation component 21 can be generated or adapted, for example, by means of the control signal 24. By means of the setpoint value, the outputting of compensation power 22 can be increased in order to result in an alternative or adapted profile A of the power withdrawal P, which, at the end 29' of the present time interval 27, actually still results in an average value 26 that is less than the threshold value S.

FIG. 3 illustrates a concrete example of this control. Reference is furthermore made to FIG. 1 and FIG. 2.

From the factory meter 14 the present measurement values 19', and from the component meters 18 the measurement values 19 and from the installation component 21 the present fill level 32 and from an external data source 33, for example from an input unit or configuration unit, a lower limit value 34 for the storage fill level 32, the threshold value S and time indications for a high-load time window 35 can be received and buffer-stored in a data memory 31.

Proceeding from a process start or start S10, in a step S11 a check can be made to ascertain whether normal operation N is possible or error operation E is necessary. This is made dependent on whether there is a communication connection to the meters 14, 18 and the measurement values 19, 19' can be received or are present in the data memory 31. In the case of a positive result (symbolized by a plus sign "+" in FIG. 3), normal operation is selected; in the case of a negative result (symbolized by a minus sign "−" in FIG. 3), error operation E is selected.

In normal operation, in a step S12, the present measurement values 19, 19' can be read out or received. This can be done for example in each case in an interval of 1 second to 10 seconds. In a step S13, a check can be made to ascertain whether the present time interval 27 is in the high-load time window 35. If this is the case, the average values 26 must be kept below the threshold value S, and otherwise not. In a step S14, a check can therefore be made to ascertain whether the present measurement value 19' for the power withdrawal P from the supply network 12 is greater than the threshold value S. If this is not the case, no correction or alteration of the controller 21' of the installation component 21 is necessary. It is possible to return to step S12. By contrast, if the measurement value 19' is greater than the threshold value S, in a step S15, for the present time interval 27, the forecast average value, i.e., the forecast value 28, can be calculated and a check can be made to ascertain whether the forecast value 28 is greater than the threshold value S. If this is the case, in a step S16 it is possible to calculate a setpoint value for the compensation power 22 to be output in accordance with a variant V1 and to stipulate the setpoint value by means of the control signal 24 of the controller 21' of the installation component 21. The controller 21' can then adjust the power flow of the compensation power 22 to the setpoint value.

If the predicted average value 28 is less than the threshold value S, then in a step S17 it is possible to calculate the setpoint value in accordance with a variant V2 or it is possible for the setpoint value generation to be omitted if a quality of the forecast data 30 is less than a minimum value. The setpoint value can then be stipulated by means of the control signal 24 of the controller 21' in the manner described.

If a high-load time window is not present at the present point in time T (check in step S13), then the power values do not influence the allocation of the power price of the electrical installation, that is to say that even in the event of a power withdrawal P greater than the threshold value S, no disadvantage arises with regard to the power price. In this case, in a step S18 a check can be made to ascertain whether the storage fill level 32 is less than the limit value 34. In this case, in a step S19, the installation component 21 can be charged by the stipulation of a setpoint value for the power flow. The setpoint value can be set by means of the control signal 24 in the described manner in the controller 21'. The setpoint value can be calculated in accordance with a variant V3. If the storage fill level 32 is greater than the limit value 34, it is possible to return to step S12.

If, in step S11, normal operation N cannot be selected, rather error operation E is necessary, then in a step S20 forecast data 30' for the at least one consumer 15 and/or the at least one generator 16 or generally for the power withdrawal P can be used instead of the present measurement values 19'. In a step S13', a check can again be made to ascertain whether the high-load time window 35 is present. If this is the case, in a step S14' on the basis of the forecast data 30' and the forecast data 30, in a step S14' a check can be made to ascertain whether, at the present point in time T, the power withdrawal P of power 13 is expected to be greater than the threshold value S. If this is not the case, it is possible to return to step S20. Otherwise, in a step S15', the forecast value 28 can be forecast and a check can be made to ascertain whether the forecast value is greater than the threshold value S. If this is the case, in a step S16' in accordance with a variant V4 the setpoint value can be calculated and the setpoint value can be stipulated by the control signal 24 of the controller 21'.

If the forecast value 28 is less than the threshold value S, in a step S17' in accordance with a variant V5 the setpoint value can be calculated and be stipulated by the control signal 24 of the controller 21'. If a high-load time window 35 is not present, in a step S18' a check can be made to ascertain whether the storage fill level 32 is less than the limit value 34. If this is not the case, it is possible to return to step S20. If the storage fill level 32 is less than the limit value 34, in a step S19', as in step S19, the setpoint value can be calculated in accordance with the variant V3 and be stipulated by means of the control signal 24 of the controller 21.

Overall, the method in accordance with FIG. 3 thus comprises the following algorithms:

S13, S13': Check for high-load time window 35 (present date and present time of day T compared with high-load time window 35 in the respective network area).

S14, S14': Calculation of the present power withdrawal: Measurement value 19' at the factory meter or measurement values 19 adjusted for active power of the storage farm formed by the installation component 21.

S18, S18': Check of storage fill level (present storage fill level 32 compared with limit fill level 34).

S15: Checking the average power value/forecast value 28 (forecast average value on the basis of the forecast values 30 and the measurement values 19' in the present time interval 27–e.g., average value for a 15 minute time window<limit value or threshold value S?).

S15': Checking the average power value/forecast value 28 (forecast average value purely on the basis of the forecast values 30, 30' in the present time interval 27–e.g., average value 28 for a 15 minute time window<limit value or threshold value S?).

S11: Check: Data connection ok?

S16: Setpoint value variant V1: Generation from factory withdrawal 19' with forecast data 30 (present withdrawal+ active power of the installation component 21–threshold value S+safety value X).

S17: Setpoint value variant V2: Generation from factory withdrawal 19' with forecast data 30 (present withdrawal+ active power of the installation component 21–threshold value S).

S19, S19': Setpoint value variant 3: Generation of setpoint value from storage fill level 32 (predefined setpoint value at store).

S16': Setpoint value variant 4: In error operation E, the setpoint value can be generated, for example, locally at the controller 21': Generation of the setpoint value from factory withdrawal (present forecast value 30'+active power of the installation component 21–threshold value S+safety value X).

Setpoint value variant 5: In error operation E, the setpoint value is generated at the controller 21': Generation of the setpoint value from factory withdrawal (present forecast value+active power of the installation component 21–threshold value S).

However, in the manner described, it is possible to provide for omitting the setpoint value generation depending on the forecast quality of the forecast values 30, 30'.

The following example illustrates the computation formulae indicated above. It is important to note that consumed power is reckoned as positive and output power as negative.

The present withdrawal is the net power demand of the at least one consumer 15, e.g., +12 kW. The compensation power 22 provided by the installation component 21 has a negative value, e.g., −2 kW. The threshold value S can be, for example, 8 kW. Consequently, for the calculation: present withdrawal+active power of the installation component 21–threshold value S, the value 12 kW−2 kW−8 kW=2 kW results, i.e., the power withdrawal P is 2 kW above the threshold value, and so the setpoint value for the controller 21' must be adapted or increased by this value. In order to obtain a buffer or safety margin with respect to the threshold value S, the additional safety value X can be provided, which can be, for example, in a range of 0.5 kW to 10 kW. As a result of this safety value X, the power output of the installation component 21 is increased and the compensation power is adjusted to a value that results in a power withdrawal P having the value S-X.

The "peak shaving" for peak load management thus provides for a store to supply the factory or the installation if the electricity withdrawal from the network exceeds a threshold value (store discharged). The store can be charged again at times with low load. In this case, the example from FIG. 3 shows the network utilization for the special case where the store supplies the factory during the high-load time windows (store discharged) and is charged outside the high-load time windows.

Taking account of the measurement values 19, 19' thus results in the incorporation of real-time data, in particular of the load or of the consumption and of the power capacity, of the generators and consumers. In addition, forecast data 30, 30' are used which can be formed on the basis of historical power data. Furthermore, the forecast can be enhanced by present forecast-relevant input parameters, such as, for example, in relation to the weather and/or a failure of at least one installation component and/or an adaptation of production numbers, which are relevant to the energy consumption and/or energy generation.

The control is then effected on the basis of these data, which enables the temporal profile of the withdrawn power 13 to be smoothed reliably and in the manner that conserves resources.

By means of the control device 20, a dynamic adaptation of the power of flexible consumers, generators and in particular stores is thus made possible by the incorporation of real-time data. The method on the basis of real-time data (measurement values 19, 19') thus constitutes an efficient methodology for load peak limiting which is suitable in particular for rapidly reacting installation components (assets) (e.g., battery stores) in order to achieve control of the installations. This is because the billing-relevant power 13 of the electricity withdrawal is calculated on the basis of, for example, quarter-hourly average values 26, 28 and in this case is enhanced and iteratively coordinated with real-time forecasts 30. This is because the billing-relevant average 15-minute average value 28 can be forecast by means of the detection of real-time data 19, 19'. Knowledge of this forecast value 28 makes it possible to influence the billing-relevant average value 26 that finally results.

In the previous exemplary embodiment it was assumed that only the installation component 21 is controllable flexibly with regard to its power. Of course, a plurality of flexibly controllable installation components can also be provided, which can then be controlled in each case in accordance with the method in order thus to provide the required compensation power overall with a plurality of controllable installation components. In this regard, for example, the installation components 15 and/or 16 can also be available in each case as a flexibly controllable installation component. A multi-asset application is then involved.

Overall, the example shows how a system for dynamic load peak limiting can be provided by the invention.

LIST OF REFERENCE CHARACTERS

10 Installation
11 Network connection
12 Electrical supply network
13 Electrical power
14 Factory meter
15 Electrical consumer
16 Electrical generator
17 Installation components
18 Component meter
19 Measurement values
19' Measurement value
20 Control device
21 Controllable installation component
21' Controller
22 Compensation power
23 Meter
24 Control signal
25 Time interval
26 Average value
27 Present time interval
28 Forecast value
29 Start
29' End
30 Forecast data
30' Forecast data
31 Data memory
32 Storage fill level
33 External data source
34 Limit value
35 High-load time window
S10 to S19 Method step
P Power withdrawal
T Present point in time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an installation component for load peak limiting in an electrical installation connected to an electrical supply network, the method comprising:
  detecting respective average values of a power withdrawal by the electrical installation from the electrical supply network for each of a plurality of successive time intervals;

determining that an average value of the power withdrawal for at least one of the successive time intervals is above a predetermined threshold value;

in response to determining that the average value of the power withdrawal for the at least one of the successive time intervals is above the predetermined threshold value, providing electrical compensation power from the installation component to the electrical installation, such that the average value of the power withdrawal for a subsequent time interval is below the predetermined threshold value;

predicting, at a present time within a present time interval, a forecast average value of the power withdrawal for the present time interval, wherein the forecast average value is predicted based on forecast data of the power withdrawal for at least one other installation component extending from the present time to the end of the present time interval;

determining that the forecast average value is greater than or equal to the predetermined threshold value;

determining, during the present time interval and in response to determining that the forecast average value is greater than or equal to the predetermined threshold value, an amount of electrical compensation power to be provided by the installation component to the electrical installation so that the average value of the power withdrawal for the present time interval is below the predetermined threshold value; and controlling the installation component, during the present time interval, to provide the amount of electrical compensation power to the electrical installation.

2. The method of claim 1, further comprising:

measuring the power withdrawal during the respective present time interval; and determining that the power withdrawal measured during the present time interval is greater than or equal to the predetermined threshold value, wherein the forecast average value is predicted in response to determining that the power withdrawal measured during the present time interval is greater than or equal to the predetermined threshold value.

3. The method of claim 1, wherein each of the successive time intervals, the subsequent time interval, and the present time interval has a duration that is between 30 seconds and 15 min.

4. The method of claim 1, wherein the forecast data is based on historical power data of the at least one other installation component.

5. The method of claim 1, further comprising:

determining that the forecast average value is less than the predetermined threshold value but greater than a predetermined safety value;

in response to determining that the forecast average value is less than the predetermined threshold value but greater than a predetermined safety value, controlling the installation component to provide electrical compensation power to the electrical installation so as to reduce the power withdrawal to the predetermined safety value, via setting a setpoint value for the electrical compensation power.

6. The method of claim 1, wherein the installation component comprises at least one of: an electrical generator, a store, and an electrical consumer.

7. The method of claim 1, wherein for predicting the forecast average value of the present time interval, a previous profile of the power withdrawal from a start of a time interval to the present point in time in a normal operating mode is formed based on measurement values from the at least one other installation component and/or from the network connection, and wherein, in an absence of the measurement values in an error operating mode, further forecast data of the at least one other installation component are taken as a basis.

8. The method of claim 1, further comprising:

measuring the power withdrawal during the present time interval;

determining that the power withdrawal during the present time interval is less than the predetermined threshold value; and in response to determining that the power withdrawal during the present time interval is less than the predetermined threshold value, regenerating the installation component with electrical power from the electrical supply network, if the installation component also does not need not provide the electrical compensation power.

9. The method of claim 1, wherein the power withdrawal is limited to the predetermined threshold value only during a high-load time window defined for the electrical supply network.

10. A control device for controlling the installation component, wherein the control device comprises: a computing unit configured to perform the method of claim 1.

11. A system for reducing electrical load peaks in an electrical installation, comprising the installation component and the control device of claim 10.

* * * * *